United States Patent [19]

Yonezawa et al.

[11] Patent Number: 5,024,064
[45] Date of Patent: Jun. 18, 1991

[54] METHOD OF OPERATING ADSORPTION REFRIGERATOR

[75] Inventors: Yasuo Yonezawa, Nara; Toshiya Ohnishi, Sakai; Shin-ichi Okumura, Ohtsu; Akiyoshi Sakai, Toyonaka; Hiroki Nakano; Masao Matsushita, both of Neyagawa; Atsushi Morikawa; Motoshi Yoshihara, both of Yawata, all of Japan

[73] Assignee: Nishiyodo Air Conditioner Co., Ltd., Osaka, Japan

[21] Appl. No.: 479,942

[22] Filed: Feb. 14, 1990

[30] Foreign Application Priority Data

Feb. 28, 1989 [JP] Japan .................................. 1-48735

[51] Int. Cl.$^5$ .............................................. F25B 17/00
[52] U.S. Cl. ........................................ 62/106; 62/476; 62/480
[58] Field of Search .......... 62/106, 476, 480, DIG. 21

[56] References Cited

U.S. PATENT DOCUMENTS

| | | | |
|---|---|---|---|
| 4,228,845 | 10/1980 | Cowling | 62/DIG. 21 |
| 4,594,856 | 6/1986 | Rothmeyer | 62/112 |
| 4,610,148 | 9/1986 | Shelton | 62/106 X |
| 4,637,218 | 1/1987 | Tchernev | 62/480 X |
| 4,754,805 | 7/1988 | Rothmeyer | 62/480 X |
| 4,765,395 | 8/1988 | Paeye et al. | 62/480 X |

Primary Examiner—Lloyd L. King
Attorney, Agent, or Firm—Flynn, Thiel, Boutell & Tanis

[57] ABSTRACT

A method of operating an adsorption refrigerator comprising two adsorption columns each housing therein a solid adsorbent and heat transfer tubes and sealed with a refrigerant, a condenser, an evaporator, paths for refrigerant connnecting the adsorption columns to the condenser and evaporator so that the refrigerant may be circulated through the columns, and a pipeline equipped with a valve connecting directly the adsorption columns, which method comprises changing over the adsorption columns periodically alternately between adsorption and desorption phases in manner that the one and the other adsorption columns are at opposite phases and that a heat transfer medium on a heat source side and a coolant are routed through alternately in response to desorption and adsorption phases, respectively. Shortly before one cycle of adsorption and desorption phases is terminated, the paths for refrigerant are shut off and the valve is opened, the adsorption and desorption phases are further advanced between the columns while continuing to supply the heat transfer medium and coolant, thereby to finish the cycle, and subesquently, the valve is closed to change over to a next cycle of just opposite phases. Thus refrigeration efficiency is increased.

6 Claims, 7 Drawing Sheets

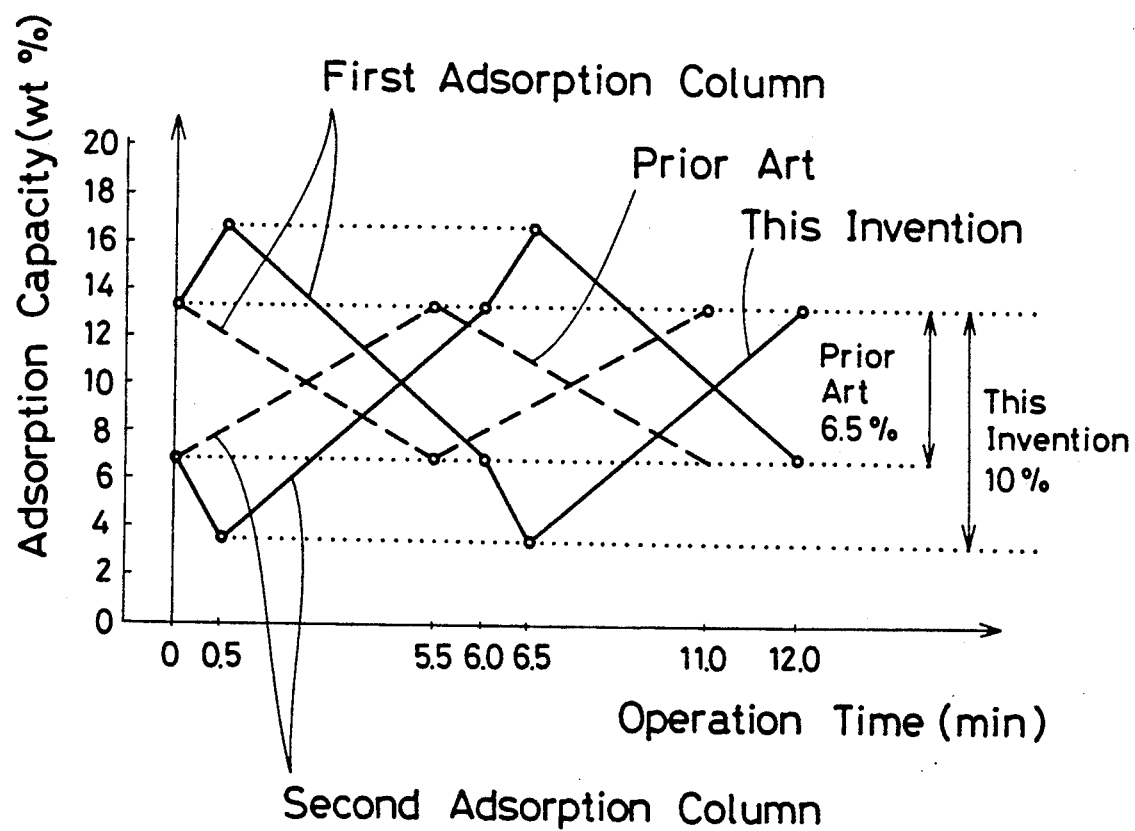

METHOD OF OPERATING ADSORPTION REFRIGERATOR

BACKGROUND OF THE INVENTION

1. Field of the Invention

This invention relates to a method of operating an adsorption refrigerator which permits an enhancement of the refrigeration efficiency. More particularly, the invention is designed to provide a method of operating an adsorption refrigerator in which two adsorption columns are directly connected through a pipeline equipped with a valve.

2. Statement of Related Art

Of adsorption refrigerators which avail themselves of adsorption and desorption actions of a solid adsorbent to and from a refrigerant to generate cold or to perform heat pump operation, such refrigerators that take advantage of low-grade heat sources, for example, warm water made available from solar collectors, etc. (e.g. warm water on the order of 85° C.), or waste heat from works have many advantages that waste energy otherwise discarded can be harnessed effectively; and that they are each made up of a smaller number of mobile components such as pumps, which fact means more economical apparatus cost, and have a smaller operation noise, as compared with compressor type refrigerators.

The adsorption refrigerators of this type, in general, comprise two sets of adsorption columns each sealed with a refrigerant and housing therein a solid adsorbent such as silica gel, zeolite, activated charcoal, activated alumina, etc. installed in parallel to each other, a condenser and an evaporator and are systematized so that a heat transfer medium for heating the adsorbent and cooling water may be supplied alternately to both adsorption columns to repeat alternately desorption and adsorption phases whereby refrigerating power output can be continuously obtained.

A problem with such prior art adsorption refrigerators is that shortly before one cycle of adsorption and desorption phases is changed over between the adsorption columns, the one adsorption column just having been at the desorption phase is full of refrigerant vapor driven off from the solid adsorbent, and, when changed over to an adsorption phase, is initially obliged to adsorb the remaining refrigerant vapor filled therein. As a consequence, at an initial stage when a new cycle of adsorption and desorption phases was started soon after the change-over, it was difficult to do its inherent work, namely to adsorb the refrigerant liquid in the evaporator to obtain a required refrigerating power. Thus the resulting refrigeration power output has been diminished.

The present inventors have already proposed and disclosed a more efficient operation method for such adsorption refrigeration system in order to further enhance its refrigeration power output (U.S. Pat. No. 4 594 856). According to this method, immediately before adsorption and desorption phases are changed over between two adsorption columns, residual heat such as warm water remaining within the desorption side column is transferred to the other adsorption column immediately before coming into a desorption phase thereby to preheat the solid adsorbent in the latter column, followed by change-over. This allows to utilize effectively the heat quantity of the system, but has also encountered the aforesaid problem.

Therefore, with a view toward solving the problem, this invention has been accomplished and has for an essential object to achieve an enhancement in refrigeration efficiency of an adsorption refrigerator as stated above in a procedure that, shortly before one cycle of adsorption and desorption phases is terminated, comprises shutting off paths for refrigerant and further advancing the respective adsorption and desorption phases between two adsorption columns thereby to utilize efficiently refrigerant vapor filled in the adsorption column and subsequently changing over to a next cycle of just opposite phases.

Another object of this invention is to provide a method of operating an adsorption refrigerator meeting both high refrigeration efficiency and a relatively simple manipulation procedure.

SUMMARY OF THE INVENTION

According to this invention, there is provided a method of operating an adsorption refrigerator comprising two sets of adsorption columns each sealed with a refrigerant and housing therein a solid adsorbent and heat transfer tubes, a condenser, an evaporator and paths for refrigerant connecting the adsorption columns to the condenser and evaporator so that the refrigerant may be circulated through vessels of the two columns, which method comprises changing over periodically alternately between adsorption and desorption phases so that the one and the other adsorption columns may be at mutually different phases and a heat transfer medium on a heat source side for causing a desorption and a coolant for causing an adsorption may be alternately routed through the heat transfer tubes of the columns in response to desorption and adsorption phases; and comprises, shortly before one cycle of adsorption and desorption phases in the one adsorption column and the other adsorption column, respectively, is terminated, shutting off the paths for refrigerant, further advancing the adsorption and desorption phases between the adsorption columns while continuing to supply the heat transfer medium and coolant thereby to finish the adsorption and desorption phases, and subsequently changing over to a next cycle of just opposite phases.

To that end, according to a preferred embodiment, the adsorption refrigerator is constructed of two adsorption columns each housing therein a solid adsorbent and heat transfer tubes and sealed with a refrigerant, a condenser, an evaporator, paths for refrigerant connecting the adsorption columns to the condenser and evaporator so that the refrigerant may be circulated through vessels of the adsorption columns, and a pipeline connecting directly the two adsorption columns and equipped with a valve, and operated in the following procedure: When one cycle of an adsorption and a desorption phases comes to an end, namely, each partial pressure of the refrigerant vapor approaches a constant value in the adsorption columns, and before it is changed over to a next cycle of just opposite phases, the transfer of the refrigerant between the one adsorption column and the evaporator and between the other adsorption column and the condenser is stopped by any measures, for example, by closing of valves provided in the paths for refrigerant while the two adsorption columns are put in communication with each other by opening the valve in the pipeline connecting the two columns until a pressure equalization between them is attained, and at the time of the pressure equalization, the valve is closed, thus finishing substantially completely the adsorption and desorption phases.

At the time when one cycle of adsorption and desorption phases is being terminated, the inner pressure of the one adsorption column at the desorption phase is much higher than that of the other adsorption column at the adsorption phase because of the desorbed refrigerant vapor in the former. In that state, all the valves in the paths for refrigerant connecting the two adsorption columns to the evaporator and condenser are closed to stop the transfer of the refrigerant, concurrently with which the valve in the pipeline connecting directly both adsorption columns is opened. Then, the refrigerant vapor filled in the one adsorption column at the desorption phase is vigorously transferred, via the pipeline, to the other adsorption column at the adsorption phase until pressures of both are equalized. During this step, cooling water is continued to be fed to the other adsorption column at the adsorption phase and a heat transfer medium on a heat source side is continued to be fed to the one adsorption column at the desorption phase, similarly to the aforesaid cycle of the adsorption and desorption phases, whereby the adsorption, and desorption phases are further advanced, coincident with the transfer of the refrigerant vapor. When pressures are equalized between the two adsorption columns, the valve therebetween is closed thereby to finish one cycle of the adsorption and desorption step.

According to a preferred embodiment of the method of this invention, thereafter, residual heat transfer medium such as warm water remaining in the one desorption side is transferred to the other adsorption side to preheat it for its subsequent desorption phase. After the preheating step, a next cycle of just opposite phases is changed over too.

Upon change-over to the next cycle of adsorption and desorption phases in the one and the other adsorption columns, since the refrigerant vapor filled in the one adsorption column having finished the desorption phase was transferred directly to the other adsorption column, the other adsorption column newly having come into a desorption phase contains a larger amount of the refrigerant, which means that the desorption of more refrigerant is enabled, so that a larger amount of refrigerant liquid can be stored in the condenser and accordingly, can be fed to the evaporator. On the other hand, the one adsorption column, which is to adsorb the refrigerant from the evaporator, is decreased in refrigerant gas filling it, so that its adsorption capacity is increased, being capable of adsorbing sufficiently the refrigerant from the evaporator.

BRIEF DESCRIPTION OF THE DRAWINGS

The invention will be described hereinbelow in more detail with reference to the accompanying drawings.

FIG. 1 shows a state in which a first adsorption column is at an adsorption phase and a second adsorption column, at a desorption phase.

FIG. 2 shows, shortly before one cycle of adsorption and desorption phases as shown in FIG. 1 is terminated, an advancement step of the adsorption and desorption phases.

FIG. 3 shows a preheating step to the first adsorption column after the advancement step.

FIG. 4 shows a changed-over state, just opposite to FIG. 1, when the first adsorption column is at a desorption phase and the second adsorption column, at an adsorption phase.

FIG. 5 is similar to FIG. 2, but shows an advancement step of opposite phases.

FIG. 6 is similar to FIG. 3, but shows a preheating step to the second adsorption column, subsequently to the advancement step.

FIG. 7 is a graphical representation of a relation between the adsorption capacity and operation time showing one example of an operation method of this invention in comparison with a prior art method.

DETAILED DESCRIPTION OF PREFERRED EMBODIMENTS

Figure 1:
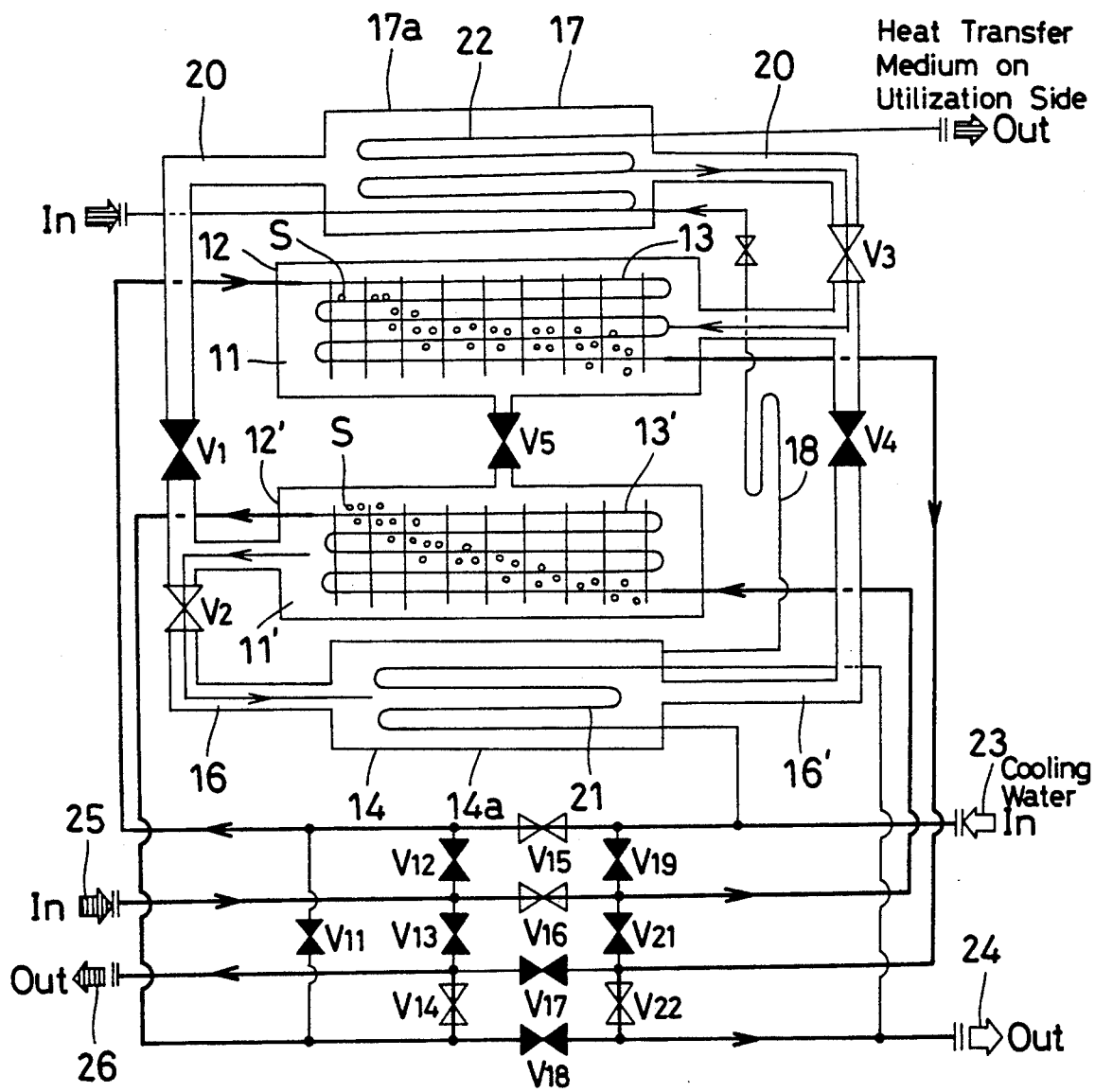
FIG. 1 to FIG. 6 are schematic illustrations of one example of an adsorption refrigerator to which a method of this invention is applicable, showing sequential steps when both adsorption and desorption steps in each adsorption column are performed.

Referring to FIG. 1 to FIG. 6, one example of an adsorption refrigerator to which an operation method of this invention is applicable will be explained.

Throughout the figures, the flow path in which a heat transfer medium or refrigerant flows is shown in solid lines and the flow path in which no heat transfer medium and refrigerant flow is shown in broken lines.

In FIGS. 1 to 6, a first and a second adsorption columns 11, 11' each house, in an evacuated vessel 12, 12', finned tubes 13, 13' which have a solid adsorbent S such as silica gel, zeolite, activated charcoal, activated alumina, etc. packed in their fin interstices, and are interconnected by the provision of a pipeline 10 equipped with a valve $V_5$ midway thereof.

Through the finned tubes 13, 13', a warm water which is supplied from a low-grade heat source, such as solar heat collectors, waste heat from works, etc. via a heat exchanger or directly, or a cooling water which is produced in a cooling water producer, such as a cooling tower is alternately routed.

A condenser 14 is connected to the vessels 12, 12' of the adsorption columns 11, 11' through ducts 16, 16' equipped with valves $V_4$, $V_2$, and an evaporator 17 is connected to the bottom of a shell 14a of the condenser 14 via a trap-shaped pipeline 18. The evaporator 17 is connected, at its casing 17a, to the evacuated vessels 12, 12' of the first and second adsorption columns 11,11' through ducts 20,20' equipped midway with valves $V_3$, $V_1$. By this piping system, a predetermined amount of a refrigerant such as water sealed in the evacuated vessels 12,12' can circulate through the ducts in response to the opening and closing of the valves $V_1$, $V_2$, $V_3$, $V_4$.

The condenser 14 houses, in the shell 14a, finned tubes 21, e.g. cross-fin tubes, aero fin tubes, etc., through which cooling water is adapted to be always routed, so that the refrigerant vapor driven off from the solid adsorbent S within the adsorption columns 11, 11' may be condensed and liquefied, collected and stored at the bottom of the shell 14a and supplied via the pipeline 18 to the evaporator 17.

On the other hand, the evaporator 17 incorporates, in the laterally elongated casing 17a, heat transfer tubes 22 for passing therethrough a utilization side heat transfer medium and evaporating dishes (not shown) located below the heat transfer tubes 22. There, the refrigerant liquid introduced from the condenser 14 is stored in the evaporating dishes, and evaporated and gasified on the surfaces of the heat transfer tubes 22 to take latent heat of evaporation from the utilization side heat transfer medium, thereby cooling it.

In the Figures, $V_{11}, V_{12}, V_{13}, \ldots V_{21}$ are valves provided in pipelines linking the heat transfer tubes 13, 13' of the adsorption columns 11,11', the heat transfer tubes 21 of the condenser 14, a cooling water inlet 23, a cooling water outlet 24, a heat transfer medium inlet 25 on a heat source side, and a heat transfer medium outlet 26 on the heat source side. The valves $V_{11}, V_{12}, V_{13}, \ldots V_{21}$ and the aforesaid valves $V_1, V_2, \ldots, V_5$ are adapted to be operated to open or close sequentially on the basis of directions of control means (not shown).

The method of this invention will be hereinbelow described of the refrigerator constructed above.

FIG. 1 shows a step where the first adsorption column 11 is supplied with a cooling water and performs an adsorption operation whereas the second adsorption column 11' is supplied with a heat transfer medium on a heat source side and performs a desorption operation.

That is, the heat transfer medium on the heat source side introduced from the inlet 25 is admitted through the valve $V_{16}$ to the heat transfer tubes 13' of the second adsorption column 11', where it heats and desorbs the solid adsorbent S, passes through the valve $V_4$ and is refluxed via the outlet 26 for the heat transfer medium on the heat source side, to the heat source.

The refrigerant vapor heated and desorbed in the second adsorption column 11' is admitted via the valve $V_2$ to the condenser 14, where it is cooled and liquefied by cooling water flowing through the heat transfer tubes 21, collected and stored at the bottom of the shell 14a, and transferred through the pipeline 18 to the evaporator 17 by reason of pressure difference, etc.

During this step, the cooling water is admitted to the heat transfer tubes 21 of the condenser 14 and also introduced through the valve $V_{15}$ into the heat transfer tubes 13 in the first adsorption column 11, where the solid adsorbent S is cooled to adsorb the refrigerant vapor, so that the refrigerant liquid in the evaporator 17 is evaporated vigorously from the surfaces of the heat transfer tubes 22 to remove latent heat of evaporation from the heat transfer medium on the utilization side flowing through the heat transfer tubes 22, thus cooling it. As a consequence, the utilization side heat transfer medium thus cooled can be supplied to a fan coil unit installed at an air conditioning space area, whereby it is possible to satisfy general temperature conditions of an air conditioning system (for example, cooling water inlet temperature: 30° C., inlet temperature of utilization side heat transfer medium: 12° C., outlet temperature of it: 7° C.).

Figure 2:
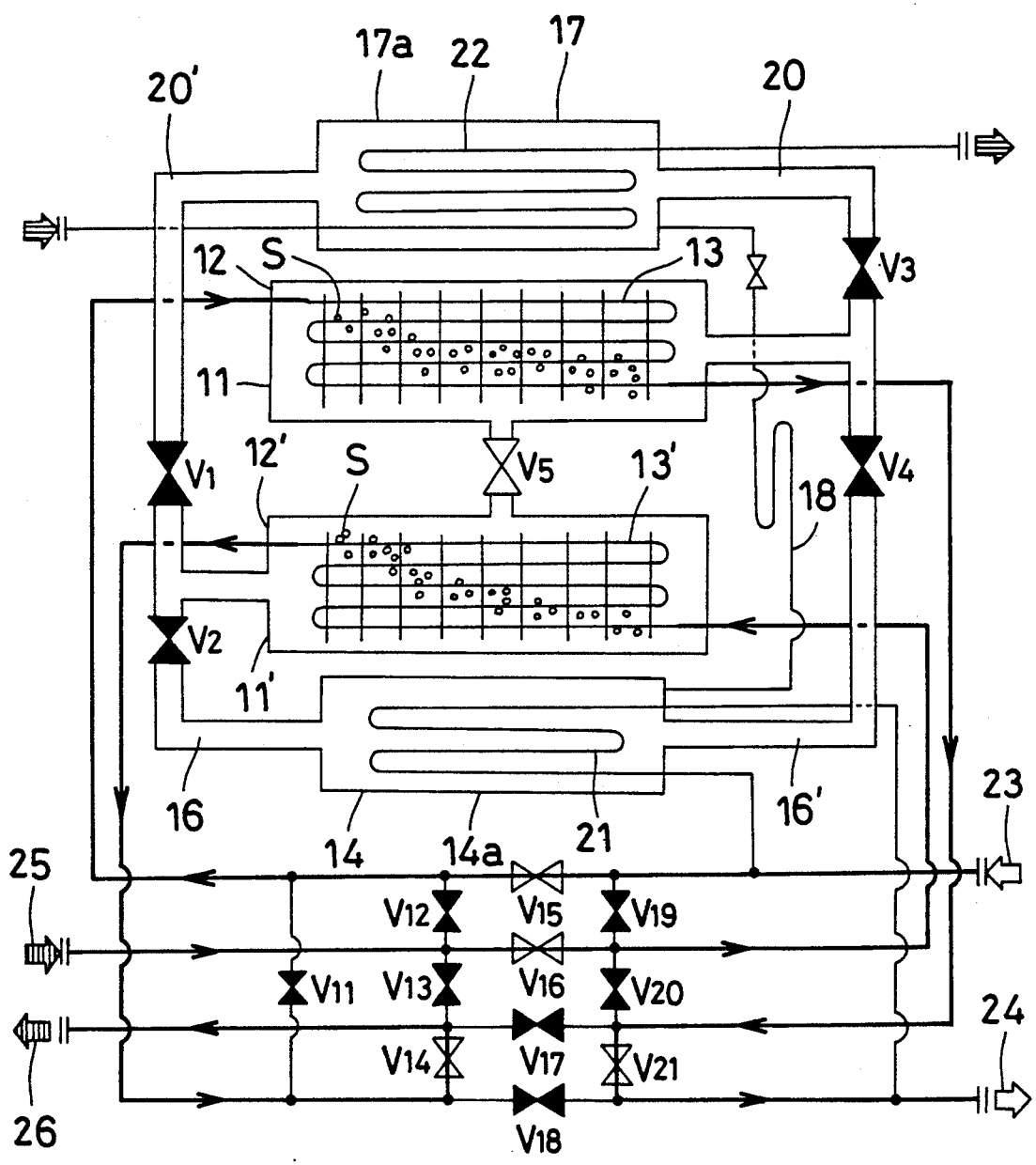

In terminating the adsorption and desorption phases of the adsorption columns 11,11' in the foregoing operation state, the valves $V_2, V_3$ and $V_5$ are switched at one time as shown in FIG. 2 with the valves $V_{11}, V_{12} \ldots V_{21}$ remaining unchanged. Then, the cooling water and the heat transfer medium are still supplied, respectively, to the first and the second adsorption columns 11,11' whereas the flow of refrigerant through the adsorption columns 11,11', the evaporator 17 and the condenser 14 is stopped, and the refrigerant flows only between the first adsorption column 11 and the second adsorption column 11', instead.

Here, the second adsorption column 11' is at a high pressure condition, full of the desorbed refrigerant vapor while the first adsorption column 11 is at a low pressure condition, adsorbing the refrigerant. Hence the refrigerant vapor blows off, when the valve $V_5$ is opened, from the first adsorption column 11 through the pipeline 10 into the second adsorption column 11', until the pressures of the adsorption columns 11,11' are equalized.

During this step, the cooling water flows through the heat transfer tubes 13 to cool the solid adsorbent S in the first adsorption column 11, thus adsorbing the refrigerant vapor just shifted whereas the heat transfer medium on the heat source side flows through the heat transfer tubes 13' to heat the solid adsorbent S in the second adsorption column 11', thus expediting the adsorption and assisting the refrigerant vapor in shifting, whereby the adsorption and desorption phases are further advanced in the first and the second adsorption columns 11,11', respectively.

Figure 3:
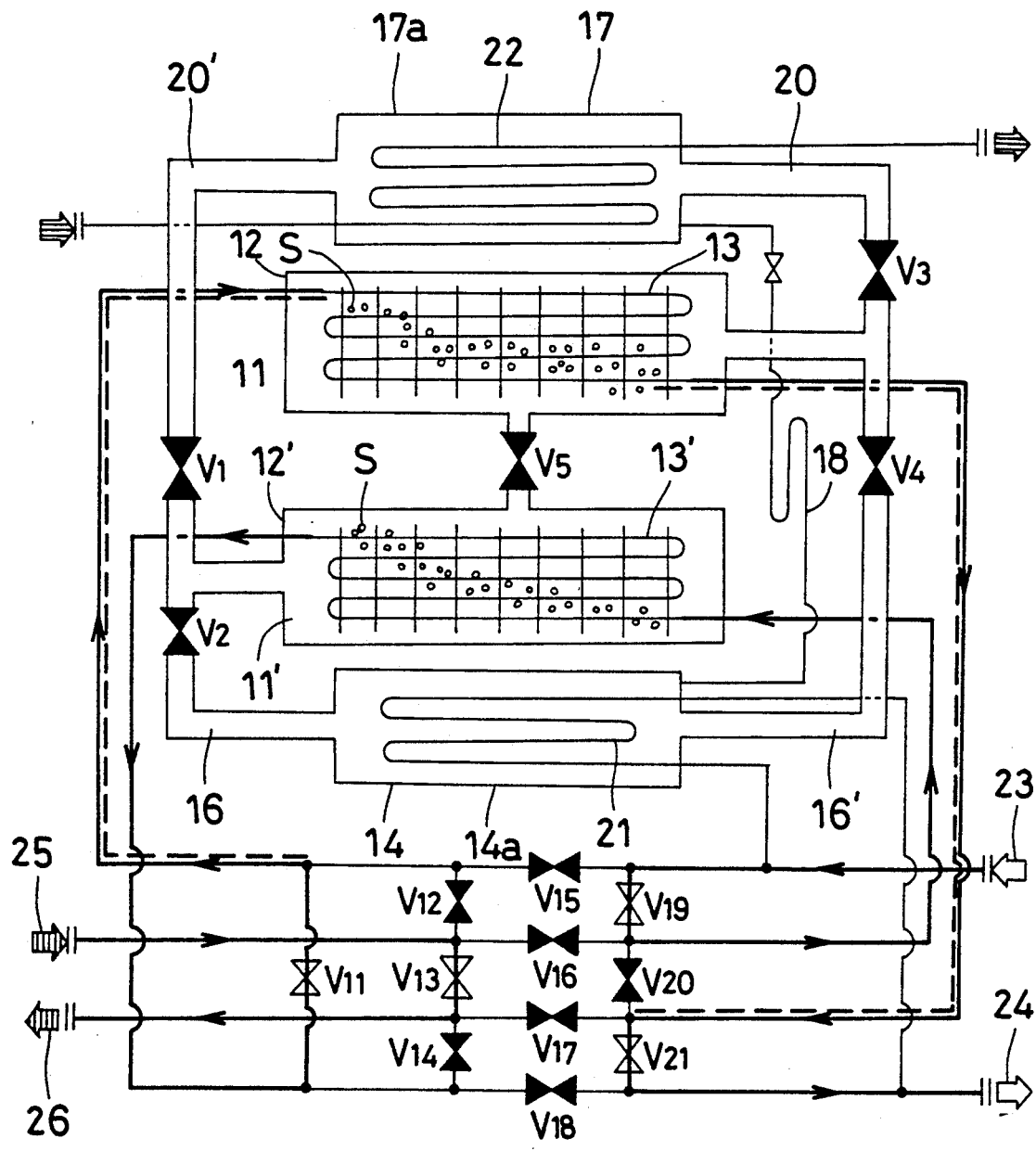

The instant that both adsorption columns 11,11' are equalized in pressure and the adsorption and desorption phases no longer proceed in both adsorption columns 11,11', the valve $V_5$ is closed as shown in FIG. 3, and the adsorption and desorption advancement step is terminated, whereby one cycle of adsorption and desorption step is finished.

Concurrently, the valves $V_{11}, V_{13}, V_{14}, V_{15}, V_{16}$ and $V_{19}$ are switched at one time. Then, a heat transfer medium on a heat source side introduced from the inlet 25 is directed via the valve $V_{13}$ directly toward the outlet 26 and the supply of it to the second adsorption column 11' is stopped, and consequently, the heat transfer medium so far supplied, for example, warm water, remains in the heat transfer tubes 13' of the second adsorption column 11'. On the other hand, cooling water is supplied via the valve $V_{19}$ to the heat transfer tubes 13, so that the residual warm water is forced and introduced through the valve $V_{11}$ out into the heat transfer tubes 13 in the first adsorption column 11, where it is offered for preheating of the solid adsorbent S just before coming into a desorption phase.

Figure 4:
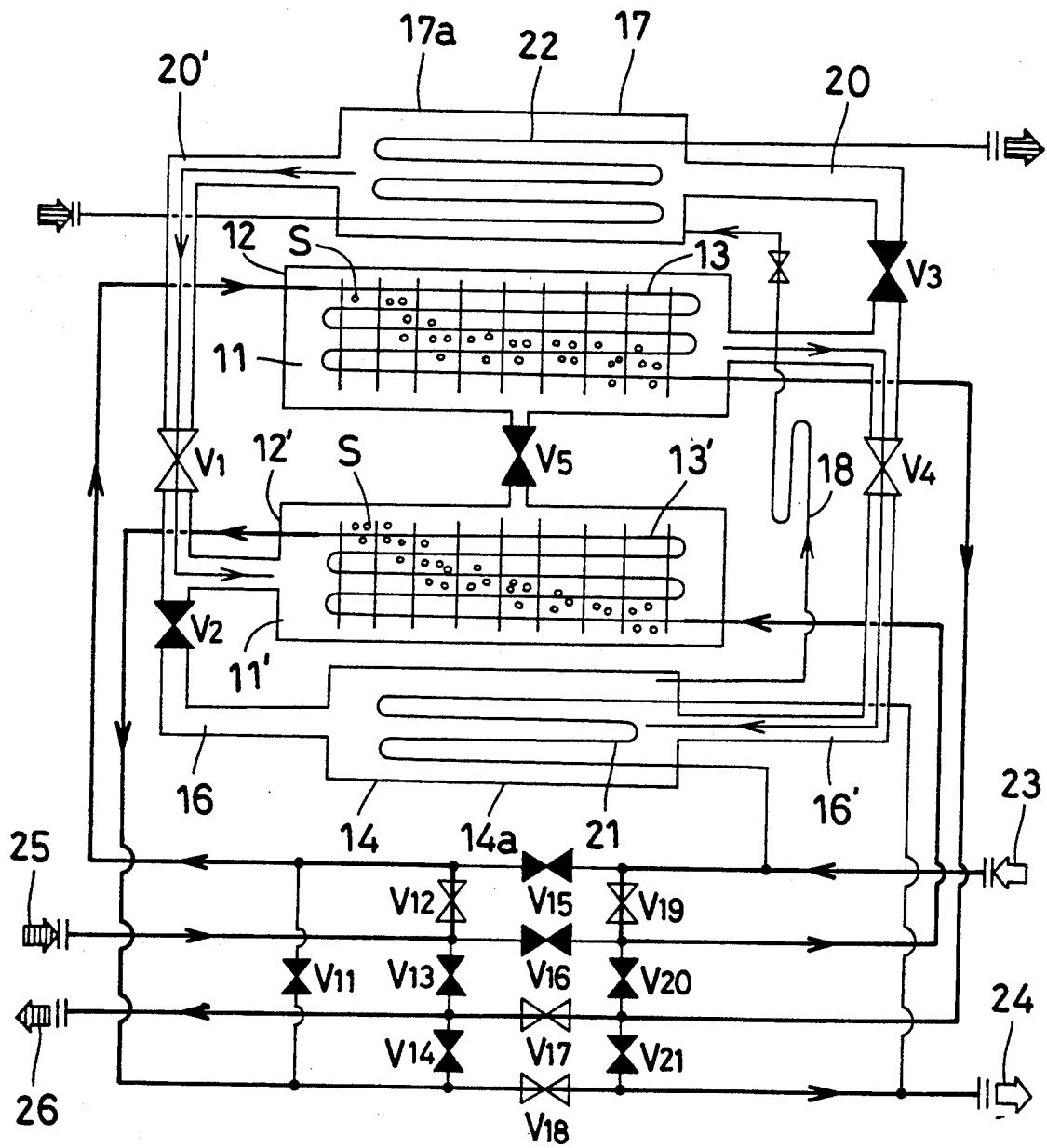

Here, if the operation is further continued, the residual warm water just introduced in the first adsorption column 11 will be flowed out of the cooling water outlet 24 side owing to the cooling water supplied to the second adsorption column 11'. Therefore, the valves $V_{11}, V_{12}, V_{17}, V_{18}, V_{21}$ are switched as shown in FIG. 4 at such a timing that permits to avoid the flowing-out and concurrently, the valves $V_1$ and $V_4$ are opened. The heat transfer medium on the heat source side admitted from the inlet 25 is flowed via the valve $V_{12}$ into the heat transfer tubes 13 in the first adsorption column 11 and, while driving out the residual warm water for preheating the adsorbent which remains in the heat transfer tubes 13, heads for the heat transfer medium outlet 26 on the heat source side through the valve $V_{17}$. Consequently, the residual warm water is refluxed to a heat exchanger on the heat source side, thereby to avoid the loss of heat quantity of the warm water.

Thus, the first adsorption column 11 comes into a desorption phase after the preheating step. Prior to the preheating step, the first adsorption column 11 has a larger amount of the refrigerant adsorbed at the advancement step for adsorption and desorption as in FIG. 2, so that a large quantity of refrigerant gas is evolved from the solid adsorbent S and enters through the valve $V_4$ and the duct 16' into the condenser 14, where it is condensed and liquified, and transferred to the evaporator 17.

At the same time, the second adsorption column 11' comes into a desorption phase and is decreased in amount of the refrigerant vapor filled therein owing to the advancement step for adsorption and desorption as shown in FIG. 2. Accordingly, the second adsorption column 11' has a capacity sufficient to liquefy and adsorb a large quantity of the refrigerant liquid within the evaporator 17 on the solid adsorbent S, thus aiding in the enhancement of refrigeration efficiency.

Figure 5:
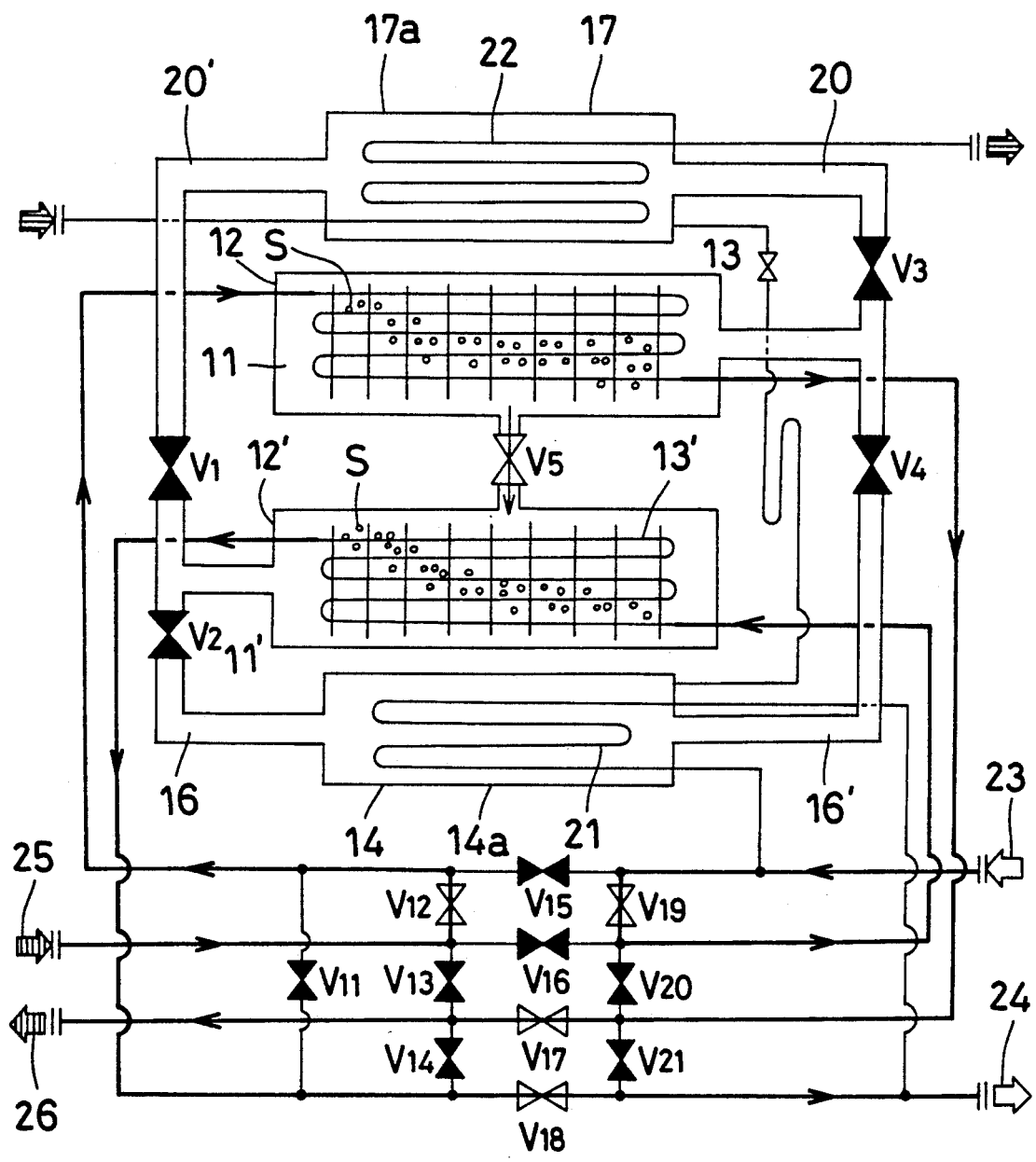
Figure 6:
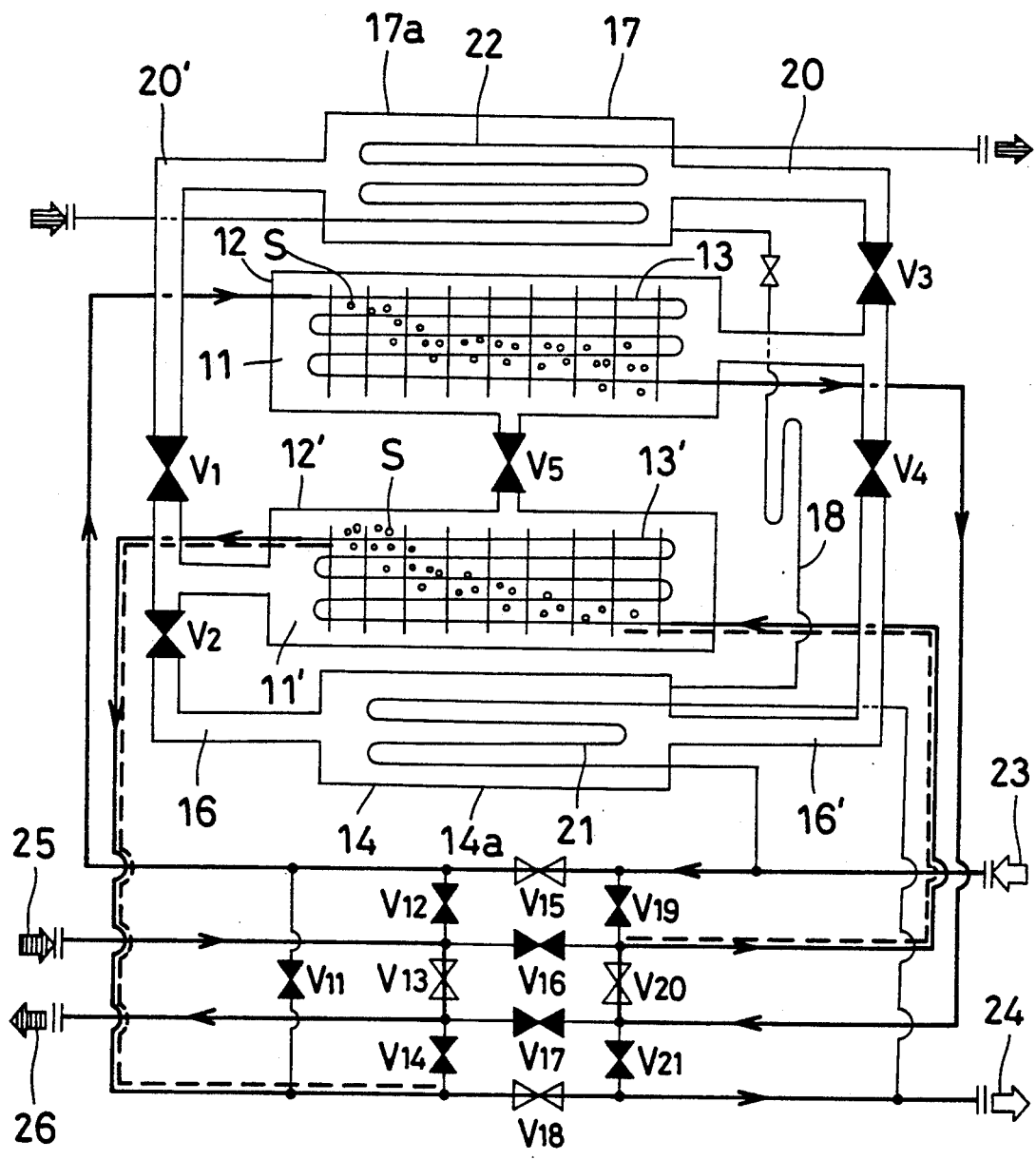

Further in reversing the state of the cycle of adsorption and desorption phases in the second and first adsorption columns 11', 11 to the state shown in FIG. 1, the same procedure as above is taken, that is, the valves $V_1$ and $V_4$ are closed and the valve $V_5$ is opened at the outset, whereby the first adsorption column 11 and the second adsorption column 11' are put in communication with each other. Then, the refrigerant gas is transferred from the first adsorption column 11 toward the second adsorption column 11', thereby to further advance the desorption phase in the first adsorption column 11 and the adsorption phase in the second adsorption column 11' (FIG. 5). Thereafter, a preheating step of the second adsorption column 11' is conducted by the residual warm water remaining in the first adsorption column 11 (FIG. 6), followed by change-over of the adsorption and desorption step.

The valve manipulation procedure during these steps is apparent and the explanation of it will be omitted.

The preheating step to the adsorption column side just before coming into a desorption phase is usually carried out subsequently to the advancement step, but, shortly before the advancement step is finished and the valve $V_5$ between the two adsorption columns 11,11' is closed, can be begun, as the case may be.

For the comparison of cooling efficiency between the adsorption refrigerator operated in accordance with one example of the method of this invention and a conventional refrigerator which is analogous to that of this invention except that it has no pipeline 10 interconnecting two adsorption columns and no valve $V_5$, comparative tests were carried out by the use of silica gel and water as adsorbent and refrigerant, respectively. The results obtained will be shown below.

In the comparison test, each pressure within the first and second adsorption columns and a pressure within the evaporator were measured to determine the magnitude of adsorption capacity contributing to the refrigeration in % by weight.

With the conventional adsorption refrigerator, the pressure values measured of the one adsorption column on a desorption side, the other adsorption column on an adsorption side, and the evaporator were 433.3 mmHg, 33.7 mmHg and 7.5 mmHg, respectively. The adsorption capacity (q) was calculated by the equation:

Desorption Side $q_d = 0.346 (33.7/433.6)^{1/1.6} = 0.07$

Adsorption Side $q_a = 0.346(7.5/33.7)^{1/1.6} = 0.135$

Accordingly, the adsorption capacity contributing to refrigeration is: $(0.135 - 0.07) \times 100 = 6.5$ % by weight.

With the adsorption refrigerator pertaining to this invention, the pressure of each adsorption column, when pressure equalization between the adsorption columns was reached by the opening of the valve $V_5$ before change-over, was 10.89 mmHg. Accordingly, when one cycle of the adsorption and desorption step was finished, the adsorption capacity was calculated as follows:

Desorption Side $q'_d = 0.346(10.89/433.6)^{1/1.6} = 0.035$ $\Delta q' = 0.07 - 0.035 = 0.035$; 3.5 % by weight Adsorption Side $q'_a = 0.346(10.89/33.7)^{1/1.6} = 0.17$ $\Delta q' = 0.17 - 0.135 = 0.035$; 3.5 % by weight The adsorption capacity participating in the refrigeration is increased by the amount of $\Delta q'$, and accordingly, an adsorption capacity of 10 wt.% can be obtained: $6.5 + 3.5 = 10$ % by weight.

The relation of the adsorption capacity to operation time is shown in a graphical representation of FIG. 7, in which each of the bold lines designates a step during which the adsorption and desorption phases are further advanced with the valve $V_5$ opened.

When the conventional adsorption refrigerator was operated in a cycle of adsorption and desorption steps both of 5.5 minutes, a refrigeration capacity of 100 RT (R: gas constant, T: absolute temperature) was obtained whereas in the case where according to this invention the refrigerator was operated similarly except that the valve $V_5$ was opened for 1 minute before the change-over, a refrigeration capacity of 130 RT was obtained, which means an enhancement of the capacity to 1.3 times.

As described above, when the refrigerator of this invention which has a pipeline connecting two adsorption columns and a valve equipped midway in the pipeline is operated in accordance with the method of this invention, shortly before adsorption and desorption phases are changed over to just opposite phases, the refrigerant vapor in the adsorption column on the desorption side can be transferred to the other adsorption column on the adsorption side, so that the refrigerant vapor that has not heretofore been offered for the refrigeration can be effectively used, and the adsorption and desorption step can be further advanced. Hence a refrigeration efficiency immediately after the change-over can be enhanced and consequently, an efficient adsorption refrigerator can be provided.

What is claimed is:

1. A method of operating an adsorption refrigerator comprising two adsorption columns each housing therein a solid adsorbent and heat transfer tubes and sealed with a refrigerant, a condenser, an evaporator, and paths for refrigerant interconnecting the adsorption columns to the condenser and the evaporator so that the refrigerant may be circulated through the adsorption columns, which method comprises changing over periodically alternately adsorption and desorption phases between the adsorption columns in such a manner that the one adsorption column and the other adsorption column are at mutually different phases and that a heat transfer medium on a heat source side and a coolant are alternately routed through the heat transfer tubes of the one adsorption column and the other adsorption column in response to desorption and adsorption phases; and further comprises, shortly before one cycle of an adsorption and a desorption phases is terminated, shutting off the paths for refrigerant; further advancing the adsorption and desorption phases between the adsorption columns while continuing to supply the heat transfer medium and the coolant, thereby to finish the cycle of adsorption and desorption phases; and subsequently changing-over to a next cycle of just opposite phases.

2. A method of operating an adsorption refrigerator as set forth in claim 1, which further comprises, after the step of advancing the adsorption and desorption phases, conducting a preheating step including stopping the supply of the heat transfer medium and forcing the heat transfer medium remaining after the desorption in the desorption side column out into the other adsorption column just before coming into a desorption phase by the supply of the coolant.

3. A method of operating an adsorption refrigerator comprising two adsorption columns each housing therein a solid adsorbent and heat transfer tubes and sealed with a refrigerant, a condenser, an evaporator, paths for refrigerant interconnecting the adsorption columns to the condenser and the evaporator so that the refrigerant may be circulated through the columns, and a pipeline connecting the two adsorption columns directly to one another and equipped with a valve, the adsorption columns being adapted to be changed over periodically alternately between an adsorption and a desorption phases so that the one adsorption column may be at a different phase from the other adsorption column and that a heat transfer medium on a heat source side and a coolant may be alternately routed through the heat transfer tubes of the one adsorption column and the other adsorption column in response to desorption and adsorption phases; which method comprises, shortly before one cycle of adsorption and desorption phases is terminated, sequential steps of : shutting off the paths for refrigerant and simultaneously opening the valve between the two columns, further advancing the adsorption and desorption phases between the adsorption columns while continuing to supply the heat transfer medium and the coolant until pressure equalization between the two columns is attained, thereby to finish the cycle of adsorption and desorption phases; closing the valve; and subsequently changing-over to a next cycle of just opposite phases.

4. A method of operating an adsorption refrigerator as set forth in claim 3, which further comprises, after the step of advancing the adsorption and desorption phases, carrying out a preheating step.

5. A method of operating an adsorption refrigerator as set forth in claim 4, wherein the preheating step includes stopping the supply of the heat transfer medium and forcing the heat transfer medium remaining in the desorption side column out into the other adsorption column just before coming into a desorption phase by the supply of the coolant.

6. A method of operating an adsorption refrigerator as set forth in claim 4, which further comprises, shortly before the step of closing the valve, carrying out a preheating step including stopping the supply of the heat transfer medium and driving the heat transfer medium remaining in the desorption side column out into the other adsorption column just before coming into a desorption phase by the supply of the coolant.

* * * * *